United States Patent
Hinkkanen et al.

(10) Patent No.: US 12,463,570 B2
(45) Date of Patent: Nov. 4, 2025

(54) STABLE AND PASSIVE OBSERVER-BASED V/Hz CONTROL FOR INDUCTION MOTORS

(71) Applicant: ABB Schweiz AG, Baden (CH)

(72) Inventors: Marko Hinkkanen, Espoo (FI); Lauri Tiitinen, Espoo (FI)

(73) Assignee: ABB Schweiz AG, Baden (CH)

( * ) Notice: Subject to any disclaimer, the term of this patent is extended or adjusted under 35 U.S.C. 154(b) by 232 days.

(21) Appl. No.: 18/475,971

(22) Filed: Sep. 27, 2023

(65) Prior Publication Data
US 2024/0128905 A1  Apr. 18, 2024

(30) Foreign Application Priority Data
Oct. 5, 2022 (EP) ................................ 22199833

(51) Int. Cl.
*H02P 21/13* (2006.01)
*H02P 21/14* (2016.01)

(52) U.S. Cl.
CPC ............ *H02P 21/13* (2013.01); *H02P 21/141* (2013.01)

(58) Field of Classification Search
CPC ...... H02P 21/22; H02P 21/18; H02P 21/0017; H02P 6/182; H02P 6/183; H02P 21/141; H02P 21/13; H02P 21/12; H02P 6/18; H02P 23/12; H02P 21/20; H02K 21/145; H02K 1/278; H02K 11/27; H02K 11/33; H02K 11/26; H02K 1/276
See application file for complete search history.

(56) References Cited

U.S. PATENT DOCUMENTS

| | | | |
|---|---|---|---|
| 11,239,772 B1* | 2/2022 | Bojoi | H02P 21/22 |
| 2015/0002071 A1* | 1/2015 | Wang | H02P 21/08 |
| | | | 318/799 |
| 2021/0075354 A1* | 3/2021 | Sun | H02P 27/12 |

OTHER PUBLICATIONS

Dybkowski Mateusz et al; Speed sensor fault tolerant direct torque control of induction motor drive; 2014 16th International Power Electronics and Motion Control Conference And Exposition, IEEE; Sep. 21, 2014; 6 Pages.
Hinkkanen Marko et. al; Observers for Sensorless Synchronous Motor Drives: Framework for Design and Analysis; IEEE Transactions on Industry Applications, IEEE Service Center, Piscataway, NJ; vol. 54, No. 6; Nov. 1, 2018; 11 Pages.
(Continued)

*Primary Examiner* — Said Bouziane
(74) *Attorney, Agent, or Firm* — Whitmyer IP Group LLC (57) ABSTRACT

According to an aspect, there is provided an apparatus for a drive for driving an induction motor. The apparatus having means for performing the following. The apparatus obtains a stator current vector of the induction motor and estimates, using a state observer for the stator and/or rotor flux linkage vector of the induction motor, the stator and/or rotor flux linkage vector based on the stator current vector, a voltage reference vector and a stator angular frequency reference. The state observer is a speed-sensorless reduced-order state observer based on a mathematical model of the induction motor. The apparatus performs speed-sensorless state-feedback control based on the estimated stator and/or rotor flux linkage vector, the stator current vector, a stator flux linkage reference vector and the stator angular frequency reference for calculating the stator voltage reference vector. The apparatus applies the stator voltage reference vector to an inverter of the drive.

17 Claims, 4 Drawing Sheets

(56) References Cited

OTHER PUBLICATIONS

Beddiaf Y; Database Compendex [Online] Engineering Information, Inc., New York, NY; Modified speed sensorless indirect field-oriented control of induction motor drive; Database accession No. E20162902594454; 2 Pages.

Chen Jiahao et al; Overview of Fundamental Frequency Sensorless Algorithms for AC Motors: A Unified Perspective; IEEE Journal Of Emerging And Selected Topics In Power Electronics, IEEE, Piscataway, NJ; vol. 11, No. 1; Feb. 2023; 17 Pages.

European Search Report; Application No. EP22199833; Completed: Feb. 22, 2023; 4 Pages.

Yang Wenqiang et al; Speed sensorless vector control of induction motor based on reduced order extended kalman filter; Proceedings / The Fifth International Conference On Power Electronics And Drive Systems, Peds 2003 Nov. 17-20, 2003, Novotel Apollo Hotel, Singapore, IEEE, Piscataway, NJ; vol. 1; Nov. 2023; 4 Pages.

\* cited by examiner

STABLE AND PASSIVE OBSERVER-BASED V/Hz CONTROL FOR INDUCTION MOTORS

TECHNICAL FIELD

Various example embodiments relate to control of industrial processes.

BACKGROUND

Volts-per-hertz (V/Hz) control is a commonly used variable frequency drive control scheme where the ratio between voltage and frequency fed to the motor is kept constant so as to keep torque production stable. V/Hz control methods for control of induction motors often suffer from stability problems at low speeds under heavy loads as well as at mediums speeds under low loads. To reduce the size of these unstable regions and to increase damping, conventional V/Hz control methods may include a compensator taking as an input the measured stator current. In such cases, the stability and control performance depend on the compensator whose structure is typically heuristic and, thus, trial-and-error methods need to be employed for tuning. Moreover, parametrization of the V/Hz curve including the stator resistance voltage drop (RI) compensation may be cumbersome. Even if perfect RI compensation is assumed, conventional V/Hz control methods cannot completely remove the unstable regions.

On the other hand, speed-sensorless field-oriented control methods which are based on use of a dynamic motor model may achieve local stability in substantially the whole feasible operating range. However, in many applications, the mechanical subsystem is unknown and its identification is impractical, which complicates tuning of the speed controller. Speed sensorless field-oriented control can also be sensitive to parameter errors. For operating at high speeds, a specific field-weakening algorithm is needed. Typically, the full inverter voltage is not available in the steady state, since the current controller needs some voltage reserve.

SUMMARY

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide an apparatus, a method, and computer program for control of an induction motor.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, the following mathematical conventions are employed. Vectors are denoted by boldface italicized lowercase letters and matrices by boldface non-italicized uppercase letters (or, in some cases, by boldface numerical characters). The matrix transpose will be marked with the superscript T. The superscript s is used for indicating that the quantities are given in stator coordinates (equally called αβ-coordinates) while no superscript is used for quantities given in control coordinates (equally called xy-coordinates or synchronous coordinates). Estimated quantities (i.e., quantities which have been estimated, e.g., using a flux observer, as opposed to being directly measured) are denoted with a hat operator ^. The symbol j is used for denoting the imaginary number. The vectors described below are, unless otherwise explicitly stated, column vectors (having two elements). The matrices described below are, unless otherwise explicitly stated, 2×2 matrices. The identity matrix I, the orthogonal rotation matrix J and the zero matrix 0 are defined, respectively, as $$I = \begin{bmatrix} 1 & 0 \\ 0 & 1 \end{bmatrix}, \tag{1}$$

$$J = \begin{bmatrix} 0 & -1 \\ 1 & 0 \end{bmatrix} \text{ and} \tag{2}$$

$$0 = \begin{bmatrix} 0 & 0 \\ 0 & 0 \end{bmatrix}, \tag{3}$$

In at least some of the following embodiments, a per-unit (pu or p.u.) system may be employed for mathematical description of an induction motor. The per-unit system is the dimensionless relative value system defined in terms of base values. A pu quantity $x_{pu}$ may be defined as an absolute physical value $x_{act}$ in SI-units divided by its base value $x_B$, that is, the equation $x_{pu} = x_{act}/x_B$ may apply.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware.

The embodiments to be discussed below in detail seek to overcome at least some of the problems or limitations of the existing V/Hz control methods and speed-sensorless field-oriented control methods for controlling induction motors by providing a control method combining the best aspects of V/Hz control and sensorless field-oriented control. Specifically, embodiments method involve a state-feedback control law and a flux observer, both of which are designed to be inherently sensorless, enabling the local stability and passivity in every feasible operating point. As compared to conventional V/Hz control methods, the heuristic compensator of those methods is replaced with the observer in the embodiments. As compared to sensorless field-oriented control, neither speed controller nor separate field-weakening method is needed, the full inverter voltage can be utilized, and the sensitivity to the parameter errors is reduced.

Figure 1:
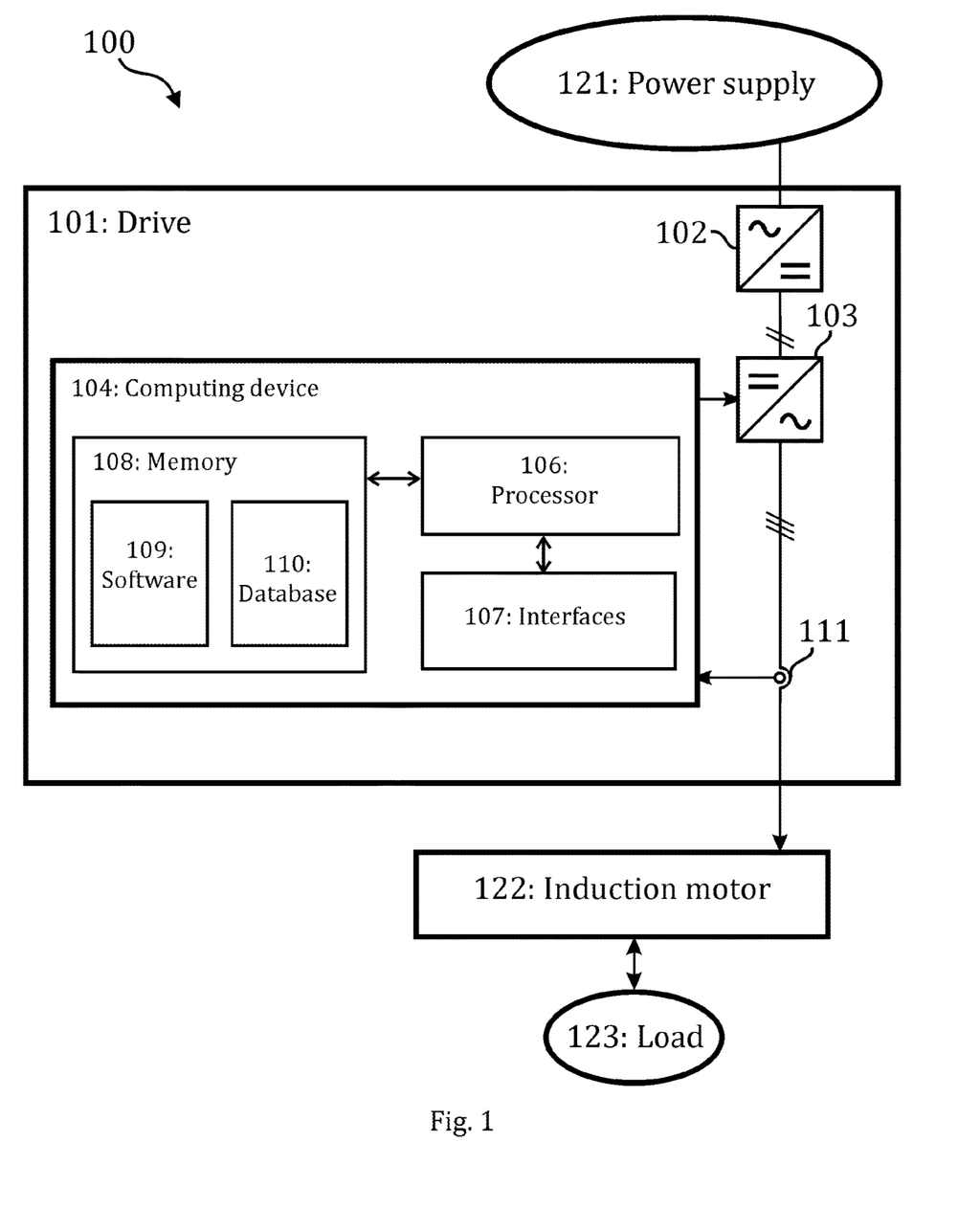
FIG. 1 illustrates an exemplary industrial system according to an embodiment.

FIG. 1 illustrates a system 100 to which embodiments may be applied. FIG. 1 illustrates simplified system architecture only showing some elements and functional entities (namely, showing only some excitation control related elements and functional entities), all being logical units whose implementation may differ from what is shown. The connections shown in FIG. 1 are logical connections; the actual physical connections may be different. It is apparent to a person skilled in the art that the system may also comprise other functions and structures.

FIG. 1 illustrates a system 100 comprising a drive 101 (equally called a motor drive) controlling an induction motor 122. The drive 101 is powered by a power supply 121. The illustrated system 100 (or specifically the drive 101) is configured to operate using an observer-based V/Hz control which is a new control method combining features from V/Hz control and sensorless field-oriented control so as to overcome problems inherent in those prior control methods.

According to a general definition, the induction motor 122 (equally called an asynchronous motor) is an alternating current (AC) electric motor in which the electric current in the rotor needed to produce torque is obtained by electromagnetic induction from the magnetic field of the stator winding. No electrical connections to the rotor may be provided in an induction motor. In induction motors, the rotation of the rotor is typically not synchronized with the frequency of the supply current at steady state.

The induction motor 122 is connected to a mechanical load 123. The mechanical load 123 may correspond, for example, to a device or a system for transporting material, such as a pump, a fan, a compressor, a blower, a conveyor belt, a crane and/or an elevator and/or a device or a system for processing materials, such as a paper machine, a mill, a stirrer and/or a centrifuge.

The drive 101 is a device used for controlling (or configured to control) the motion of the induction motor 122. Said control may be achieved by changing (either directly or indirectly due to a change in one or more related parameters) one or more drive parameters of the drive 101 which may comprise parameters such as torque, speed, power, voltage, excitation current, stator current, stator flux, stator flux linkage, frequency, motor control mode (e.g., scalar, vector or direct torque control), proportional-integral-derivative (PID) controller settings, acceleration ramp settings, deceleration ramp settings and/or other parameters affecting the operation of the drive. The drive 101 may specifically be an electrical drive (an AC drive supporting low to high voltages and/or low to high motor speeds). The drive 101 may be equally called a frequency converter. The drive 101 may be a programmable logic controller (PLC) or a (motor) soft starter. In an embodiment, the drive 101 may be a variable speed drive (VSD) or a variable frequency drive (VFD). The drive 101 (or specifically the inverter unit 103) feeds the induction motor 122 via a three-phase power supply. Contrary to some definitions of term "drive", the induction motor 122 which is driven 30 by the drive 101 does not form a part of the drive 101 itself in the context of this application (as is also shown in FIG. 1).

The drive 101 comprises a rectifier unit 102 for connecting to the alternating current (AC) power supply 121. The rectifier unit 102 is configured to convert the AC power received from the power supply 121 to DC power.

Moreover, the drive 101 comprises an inverter unit 103 which is configured to convert the DC power provided by the inverter unit 103 to AC power for driving the induction motor 121 in a controlled manner. Specifically, the inverter unit 103 is configured to feed the stator winding of the induction motor 122 to control the operation of the induction motor 122 (e.g., the air gap torque and the stator flux). In other words, the inverter unit 103 is configured to provide stator voltage signals having a particular voltage and frequency to the induction motor 121. The inverter unit 103 may be or comprise a pulse width modulation (PWM) inverter. The inverter unit 103 may take as an input at least a voltage reference vector comprising $\alpha$- and $\beta$-components of the voltage reference.

The rectifier and inverter units 102, 103 may be connected together via a direct current (DC) circuit (equally called a DC link) comprising at least one DC choke (not shown in FIG. 1).

The rectifier and inverter units 102, 103 effectively form together a DC link converter (unit) for performing a two-phase frequency conversion from the AC power of the AC power supply 121 to DC power and from said DC power to AC power suitable for driving the induction motor 122 in a controlled manner via DC. In other embodiments, a single-phase frequency conversion may be employed in the drive 101, instead of the two-phase frequency conversion. In such embodiments, a (single) direct converter unit may be provided instead of the rectifier and inverter units 102, 103 (and possibly the DC link between them).

The drive 101 comprises a current detector 111 for detecting the AC current fed to the induction motor 122 and providing it to the computing device 104 (possibly via one or more further elements not shown in FIG. 1). The detected current is usable by the computing device 104 for control of the induction motor 122.

To enable control of the induction motor 122 by the drive 101, the drive 101 comprises a computing device 104 (or, in general, one or more computing devices). The computing device 104 may be specifically configured at least to implement the observer-based V/Hz control according to embodiments (to be discussed below in detail). Namely, the computing device may be configured to apply observer-based V/Hz control to the induction motor 122 at least based on a stator flux linkage reference and a stator angular frequency reference (i.e., the desired values of the stator flux linkage and the stator angular frequency). The stator flux linkage reference and/or a stator angular frequency reference may be settable by the user. Alternatively, the stator flux linkage reference may be calculated based on nameplate values (e.g., rated voltage and frequency), or the stator flux linkage reference may be obtained from some outer control or optimization loop (such as a loss-minimization method).

The computing device 104 is electrically connected (via its interfaces 107) at least to the inverter 103 and to the current detector 111.

In some alternative embodiments, the computing device 104 may form a part of a converter (or a converter unit) of the drive 101 such as the rectifier 102 or the inverter 103.

The computing device 104 comprises a processor 106, interfaces 107 and a memory 108. The memory 108 comprises at least one database 110 and software 109 (i.e., one or more algorithms). The processor 104 may be a central processing unit (CPU) of the drive 101. In some embodiments, one or more control circuitry such as one or more processors may be provided in the computing device 104, instead of a single processor 106.

Figure 2:
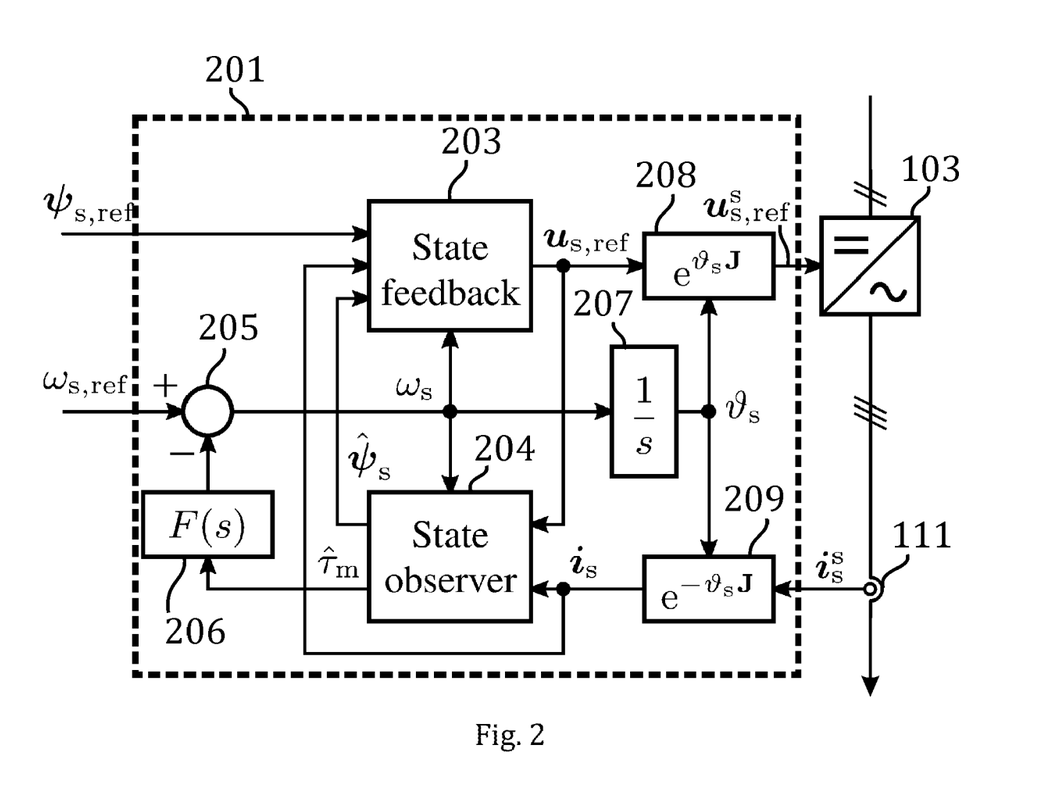
FIG. 2 shows a schematic view of elements for implementing observer-based V/Hz control.
Figure 3:
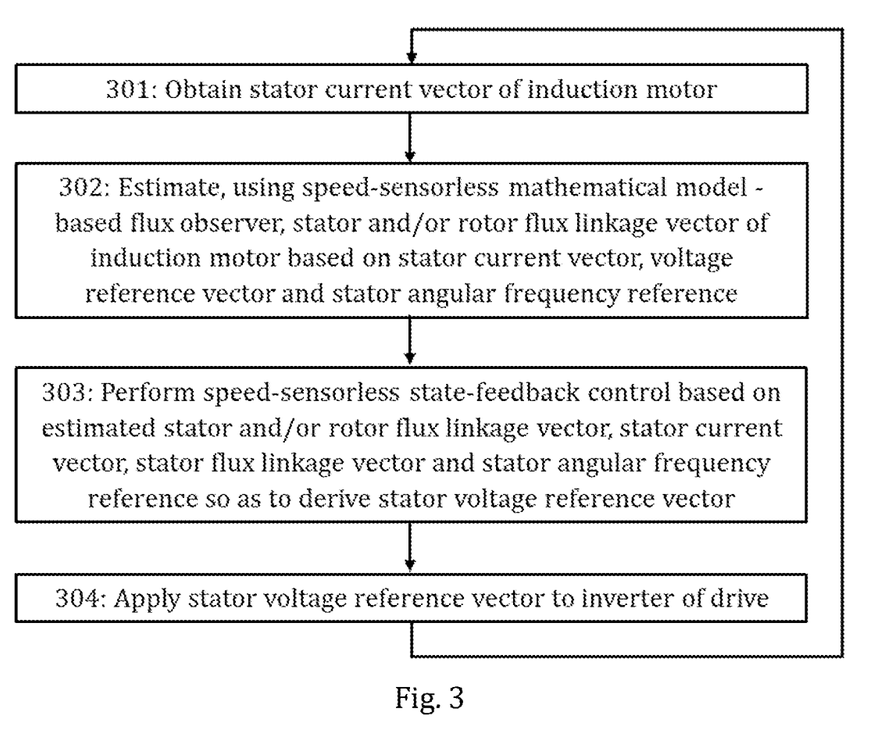
FIG. 3 illustrates an exemplary process according to embodiments.

According to some embodiments, the computing device 104 may comprise one or more control circuitry, such as at least one processor 106, and at least one memory 108, including one or more algorithms, such as a computer program code (software) 109, wherein the at least one memory 108 and the computer program code (software) 109 are configured, with the at least one processor 106, to cause the computing device 101 to carry out any one of the exemplified functionalities of the computing device or the drive to be described below (in connection with FIGS. 2 and/or 3). It is also feasible to use specific integrated circuits, such as ASIC (Application Specific Integrated Circuit), a field-programmable gate array (FPGA) or other components and devices for implementing the functionalities in accordance with different embodiments.

The memory 108 of the computing device 104 may be implemented using any suitable data storage technology, such as semiconductor based memory devices, flash memory, magnetic memory devices and systems, optical memory devices and systems, fixed memory and removable memory.

The interfaces 107 of the computing device 104 may comprise, for example, one or more communication interfaces comprising hardware and/or software for realizing communication connectivity according to one or more communication protocols. Specifically, the one or more communication interfaces 107 may comprise, for example, at least one interface providing a connection to the inverter 103. The one or more communication interfaces 104 may comprise standard well-known components such as an amplifier, filter, frequency-converter, (de) modulator, and encoder/decoder circuitries, controlled by the corresponding controlling units, and one or more antennas. The one or more communication interfaces 107 may also comprise a user interface.

The drive 101 may further comprise one or more user input devices (e.g., a control panel or a touch screen) for enabling the user to control the operation of the drive 101 (via the computing device 104) and/or a display (not shown in FIG. 1). The one or more user input devices may be specifically electrically connected to the computing device 104).

While FIG. 1 illustrates a single induction motor 122, in other embodiments the drive 101 may be used for controlling an electrical machine comprising multiple induction motors.

As was described above, the drive (or a computing device thereof) according to embodiments is configured to implement an observer-based V/Hz control method. FIG. 2 shows a schematic view of elements for implementing said observer-based V/Hz control. Specifically, FIG. 2 illustrates a set of logical elements 201 which may be implemented using a computing device 104 of the drive 101 of FIG. 1 and their connections to the inverter 103 and the current detector 111 of the drive 101 of FIG. 1.

Similar to as described in connection with FIG. 1, the observer-based V/Hz control takes, as reference inputs defining targeted values, a stator flux linkage reference $\psi_{s,ref}$ and a stator angular frequency reference $\omega_{s,ref}$ (equally called angular speed), as shown on the left side of FIG. 2. The stator flux linkage reference $\psi_{s,ref}$ and the stator angular frequency reference $\omega_{s,ref}$ (or at least the stator angular frequency reference @s,ref) may be definable by a user of the drive.

The core elements for implementing the observer-based V/Hz control are a state observer element 204 and a state feedback control element 203 implementing state-feedback control (or a particular state-feedback control law) based on feedback received from the state observer element 204 (among other inputs). The state observer element 204 is specifically a state observer defined for a stator or rotor flux linkage vector of the induction motor (or flux observer or flux state observer for the induction motor in short). In other words, the stator or rotor flux linkage vector is the state vector of the state observer 204. The state feedback control element 203 and the state observer element 204 may be implemented in control coordinates. The control coordinates are coordinates which rotate at a rate defined by the (internal) stator frequency reference @s (relative to the stator coordinates). In other words, the control coordinates are aligned with the stator frequency reference which may be given by the user (possibly taking also into account damping). The control coordinates may be equally called synchronous coordinates.

Both elements 203, 204 may be configured to be inherently (speed) sensorless, that is, they may be configured so as not to require (sensor-based) measurements of the rotor (angular) speed to operate. This is enabled by decoupling, in elements 203, 204, stator/rotor flux linkage estimation (error) dynamics from angular speed estimation (error) dynamics (i.e., from mechanical dynamics), as will be described below in detail. The elements 203, 204 enable together stabilization and passivation of the drive in its whole feasible operating range.

In the following, the operation of the state observer element 204 and the state feedback control element 203 is described, first, in general followed by a detailed description of specific implementations of the elements 203, 204.

The purpose of the state observer element 204 is to observe the state of the induction motor based on the AC currents fed to the induction motor. The state may correspond here (at least) to a stator or rotor flux linkage of the induction motor. As described above, the current detector 111 is used detect the AC currents fed to the induction motor. Specifically, the current detector 111 detects a stator current vector defining α- and β-components of the current. The $e^{-\vartheta_s J}$) multiplication element 209 applied to the detected stator current vector $i_s^s = [i_{s\alpha}^s i_{s\beta}^s]^T$ ($i_{s\alpha}^s$ and $i_{s\beta}^s$ being α- and β-components of the detected stator current) serves to perform conversion from the stator coordinates (i.e., α- and β-coordinates) to the control coordinates (i.e., the x- and y-coordinates) used by the state observer element 204. Here, $\vartheta_s$ is an angle between the control coordinates and the stator coordinates. Specifically, $\vartheta_s$ may be an angle between the x-axis and the α-axis. The control coordinates rotate at a rate $\omega_s = d\vartheta_s/dt$. The stator current vector defining x- and y-components ($i_{sd}$ & $i_{sq}$) of the stator current is denoted in the following as is and is defined according to $i_s = [i_{sx} i_{sy}]^T$.

In addition to the (measured) stator current vector $i_s$, the state observer element 204 takes as inputs the stator voltage reference vector $u_{s,ref}$ obtained from the state feedback control element 203 and the stator angular frequency $\omega_s$ (defined at least based on the stator angular frequency reference $\omega_{s,ref}$). The stator voltage reference vector $u_{s,ref}$ and the stator angular frequency $\omega_s$ may be considered control variables of the state observer 204. Similar to the stator current vector $i_s$, the stator voltage reference vector $u_{s,ref}$ also comprises x- and y-components ($u_{sx,ref}$ & $u_{sy,ref}$), that is, it is defined as $u_{s,ref}=[u_{sx,ref}\ u_{sy,ref}]^T$.

In some embodiments, the damping of the mechanical system may be increased using additional feedback from the electromagnetic torque estimate $\hat{\tau}_m$ derived by the state observer element 204 using a (passive) high-pass filter F(s) 206, as will be described in detail below. In other embodiments, no such additional feedback may be implemented (i.e., elements 205 and/or 206 may be omitted).

The purpose of the state feedback control element 203 is to calculate a stator voltage reference vector $u_{s,ref}=[u_{sx}\ u_{sy}]^T$ based on feedback received from the state observer element 204 and on the stator flux linkage reference $\psi_{s,ref}$ and the stator angular frequency reference $\omega_{s,ref}$ (optionally, adjusted in element 205 for improving damping). The stator voltage reference vector $u_{s,ref}$ is subsequently provided to the inverter 103 via the $e^{\vartheta_s J}$ multiplication element 208. The $e^{\vartheta_s J}$ multiplication element 208 serves to convert the voltage reference vector $u_{s,ref}$ from the control coordinates (i.e., the x- and y-coordinates) to the stator coordinates (i.e., $\alpha$- and $\beta$-coordinates). The angle between the control coordinates and the stator coordinates $\varepsilon_s$ is calculated based on the stator angular frequency $\omega_s$ by applying the 1/s multiplication element 207 (corresponding to integration in the time domain), where s is the complex frequency variable of Laplace domain. The stator angular frequency $\omega_s$ is evaluated based on at least the stator angular frequency reference $\omega_{s,ref}$ (and optionally on high-pass-filtered estimated torque F(s)$\tau_m$).

To carry out the calculation of the voltage reference $u_{s,ref}$, the state feedback control element 203 takes, as inputs (i.e., feedback), values of a stator flux linkage reference vector $\psi_{s,ref}$, a detected stator current vector $i_s$ and a stator angular frequency $\omega_s$. Similar to as described above for other vector quantities, the stator flux linkage reference vector $\psi_{s,ref}$ comprises x- and y-components ($\psi_{sx,ref}$ & $\psi_{sy,ref}$) of the stator flux linkage reference, that is, it is defined as $\psi_{s,ref}=[\psi_{sx,ref}\ \psi_{sy,ref}]^T$. The stator angular frequency $\omega_s$ may correspond here to the stator angular frequency reference.

In some embodiments, the stator flux linkage reference vector $\psi_{s,ref}$ may be defined more simply as $\psi_{s,ref}=[\psi_{s,ref}\ 0]^T$, where $\psi_{s,ref}$ is a stator flux linkage reference. In other words, we may have $\psi_{sx,ref}=\psi_{s,ref}$ and $\psi_{sy,ref}=0$.

The state observer element 204 may be based, in some embodiments, on an inverse-Γ model of the induction motor. To facilitate more detailed discussion of the implementation of the state observer element 204, an inverse-Γ model of the induction motor is discussed in the following. The stator current vector $i_s$ (which is measured) and the rotor flux linkage vector $\psi_R=[\psi_{Rx}\ \psi_{Ry}]^T$ (which is not measured but evaluated) may be selected as the state variables, where $\psi_{Rx}$ and $\psi_{Ry}$ are x- and y-axis components of the rotor flux linkage. With this selection, nonlinear state equations describing the electrodynamics of the induction motor in a coordinate system rotating at the angular frequency or speed $\omega_s$ may be written as $$L_\sigma \frac{di_s}{dt} = -(R_\sigma I + \omega_s L_\sigma J)i_s + (\alpha I - \omega_m J)\psi_R + u_S, \quad (4)$$

$$\frac{d\psi_R}{dt} = R_R i_s - (\alpha I - (\omega_s - \omega_m)J)\psi_R, \quad (5)$$

wherein $L_\sigma$ is a leakage inductance of the induction motor, $R_\sigma = R_s + R_R$ is a total resistance of the induction motor (with $R_s$ and $R_R$ being stator and rotor resistances of the induction motor), $u_s$ is a stator voltage vector, $\alpha = R_R/L_M$ is an inverse rotor time constant of the induction motor (with $L_M$ being a magnetizing inductance of the induction motor), $\omega_s$ is the stator angular frequency, $\omega_m$ is an (electrical) angular speed of the induction motor and t is time. The stator current vector $i_s$, the stator voltage vector $u_s$ and the rotor flux linkage vector $\psi_R$ are specifically column vectors with two elements corresponding x- and y-components of the stator current, stator voltage and rotor flux linkage, respectively. In addition to $\omega_s$, the stator voltage vector us and the (electrical) angular speed $\omega_m$ are the input variables of this nonlinear system.

The stator flux linkage vector $\psi_s$ and the electromagnetic torque $\tau_m$ (or at least the stator flux linkage vector $\psi_s$) may be selected as the output variables. The stator flux linkage vector $\psi_s$ and the electromagnetic torque $\tau_m$ may be defined as follows $$\psi_s = \psi_R + L_\sigma i_s, \quad (6)$$

$$\tau_m = i_s^T J \psi_R, \quad (7)$$

where per-unit quantities are employed in (7). It can be seen that the torque is nonlinear in the state variables. It should be noted that the equation (7) may be equally written using the stator flux linkage $\psi_s$ as $\tau_m = i_s^T J \psi_s$. Namely, $i_s^T J \psi_s = i_s^T J (\psi_R + L_\sigma i_s) = i_s^T J \psi_R$ holds here due to the fact that $i_s^T J (L_\sigma i_s) = 0$.

The state observer 204 may be specifically a reduced-order state observer (i.e., not a full-order state observer) where the stator current vector $i_s$ is a measured state variable and the rotor flux linkage vector $\psi_R$ is an evaluated (i.e., not measured) state variable. The reduced-order state observer 204 (or more specifically the reduced-order flux observer) may specifically be configured to employ a (2×2) observer gain matrix $K_0$ with a form selected so as to enable speed-sensorless estimation of the stator and/or rotor flux linkage using the reduced-order flux observer. In other words, the observer gain matrix $K_0$ may have a form selected for enabling decoupling of stator and/or rotor flux linkage estimation (error) dynamics from rotor angular speed estimation (error) dynamics (i.e., from the mechanical dynamics) which, in turn, enables the speed-sensorless estimation. The observer gain matrix $K_0$ may have a form selected so as to allow for stable magnetization and starting from zero angular speed.

Equation (4) may be reordered to have the form $$(\alpha I - (\omega_s - \omega_m)J)\psi_R = L_\sigma \frac{di_s}{dt} - (R_\sigma I + \omega_s L_\sigma J)i_s - u_s + \omega_s J \psi_R.$$

By inserting this into (5), the reduced-order flux observer may be formulated as $$\frac{d\hat{\psi}_R}{dt} = u_{s,ref} - (R_s I + \omega_s L_\sigma J)i_s - L_\sigma \frac{di_s}{dt} - \omega_s J \hat{\psi}_R + K_0 e, \quad (8)$$

where $\hat{\psi}_R$ is an estimated rotor flux linkage vector (comprising x- and y-components as its two elements), $K_0$ is the observer gain matrix and e is a correction vector (defined both for the estimated rotor flux linkage vector $\hat{\psi}_R$). The correction vector e is dependent on a difference between the rotor flux linkage vector $\psi_R$ calculated based on the measured stator current vector $i_s$ (based on (4)) and an estimated rotor flux linkage vector $\hat{\psi}_R$. Specifically, the correction vector e corresponds to said difference scaled with a matrix $(\alpha I - \hat{\omega}_m J)$. In other embodiments, the matrix $(\alpha I - \hat{\omega}_m J)$ may be defined to form a part of the observer gain matrix $K_0$, instead of the correction vector e.

The output equations for the reduced-order flux observer 204 may be defined as $$\hat{\psi}_s = \hat{\psi}_R + L_\sigma i_s \text{ and} \tag{9}$$

$$\hat{\tau}_m = i_s^T J \hat{\psi}_R \text{ or} \tag{10a}$$

$$\hat{\tau}_m = i_s^T J \hat{\psi}_s, \tag{10b}$$

where $\hat{\psi}_R$ is an estimated stator flux linkage vector (comprising x- and y-components as its two elements), $\hat{\psi}_s$ is an estimated stator flux linkage vector (comprising x- and y-components as its two elements) and $\hat{\tau}_m$ is an estimated torque of the induction motor. Equations (10a) and (10b) are alternatives to each other.

Specifically, the correction vector e in (8) may be defined, based on (4), to have the form $$e = L_\sigma \frac{di_s}{dt} + (R_\sigma I + \omega_s L_\sigma J) i_s - u_{s,ref} - (\alpha I - \hat{\omega}_m J) \hat{\psi}_R, \tag{11}$$

where $\hat{\omega}_m$ is an estimated angular (rotor) speed of the induction motor.

The estimated angular speed of the induction motor $\hat{\omega}_m$ in (11) may be estimated by integrating the component of the correction vector e orthogonal to the estimated rotor flux linkage vector $\hat{\psi}_R$. In other words, the estimated angular speed of the induction motor $\hat{\omega}_m$ may be evaluated based on $$\frac{d\hat{\omega}_m}{dt} = \alpha_0 \frac{\hat{\psi}_R^T J e}{\|\hat{\psi}_R\|^2}, \tag{12}$$

wherein $\alpha_0$ is speed-estimation bandwidth.

As special cases of (8), the condition $K_0 = 0$ yields the voltage model and $K_0 = I$ yields the current model.

The reduced-order flux observer may be rendered speed-sensorless (i.e., independent of angular speed measurements) by selecting the observer gain matrix $K_0$ to have a form which satisfies the condition $K_0 J \hat{\psi}_R = 0_{2,1}$, where $0_{2,1} = [0 \; 0]^T$ is a zero column vector with two elements. With this selection, the angular-speed-dependent term $K_0 \hat{\omega}_m J \hat{\psi}_R$ disappears from (8) to which equation (11) has been applied.

A general inherently speed-sensorless stabilizing observer gain matrix $K_0$, allowing arbitrary pole placement for the linearized estimation-error dynamics may be written as $$K_0 = \frac{G \hat{\psi}_R \hat{\psi}_R^T}{\|\hat{\psi}_R\|^2} \tag{13}$$

where $G = g_1 I + g_2 J$ is a pre-defined gain matrix (with $g_1$ and $g_2$ being gain terms of the pre-defined gain matrix).

In some embodiments, the observer gain matrix $K_0$ may be defined more specifically as $$K_0 = \frac{2\sigma_0 (\alpha I + \hat{\omega}_m J)}{\alpha^2 + \hat{\omega}_m^2} \frac{\hat{\psi}_R \hat{\psi}_R^T}{\|\hat{\psi}_R\|^2}, \tag{14}$$

where $\sigma_0$ is a desired exponential decay rate of an estimation error. It should be noted that equation (14) is a special case of (13). Notably in this case, the speed estimate $\hat{\omega}_m$ is needed only for calculating the observer gain matrix according to (14).

For inherently speed-sensorless observer gain matrices as defined in (13) and (14), the speed estimator in (12) is identical with the expression $$\frac{d\hat{\omega}_m}{dt} = \alpha_0 (\hat{\omega}_s - \hat{\omega}_r - \hat{\omega}_m), \tag{15}$$

where $\hat{\omega}_s$ is the angular speed of the rotor flux linkage estimate and $\hat{\omega}_r$ is an estimated angular slip frequency. The estimated angular slip frequency $\hat{\omega}_r$ may be calculated based on the estimated rotor flux linkage $\hat{\psi}_R$ and the estimated torque $\hat{\tau}_m$ as $$\hat{\omega}_r = \frac{R_R \hat{\tau}_m}{\|\hat{\psi}_R\|^2}. \tag{16}$$

The estimator (12) is, thus, independent of coordinates and simple to implement since the correction vector e is already available.

If stability at low speeds during regenerating mode operation is not required for the drive, the observer gain matrix $K_0$ may be simplified by replacing the estimated angular (rotor) speed $\hat{\omega}_m$ with the stator angular frequency reference $\omega_{s,ref}$, making the angular speed estimation using (12) or (15) unnecessary. In other words, the observer gain matrix $K_0$ may be defined, in such embodiments, as $$K_0 = \frac{2\sigma_0 (\alpha I + \omega_{s,ref} J)}{\alpha^2 + \omega_{s,ref}^2} \frac{\hat{\psi}_R \hat{\psi}_R^T}{\|\hat{\psi}_R\|^2}. \tag{17}$$

In some embodiments, the decay rate $\sigma_0$ for the observer gain in (14) or (17) may be scheduled as $$\sigma_0 = \zeta_\infty |\omega_s| + \frac{\alpha}{2} \tag{18}$$

where $\zeta_\infty$ is a desired damping ratio at high speeds (i.e., at speeds above a certain limit). When the observer gain matrix and the decay rate are defined, respectively, according to (14) or (17) and (18), it may be shown e.g., using small-signal analysis that, at zero stator angular frequency $\omega_s = 0$, the poles are located at $s = 0$ and $s = -\alpha$ which allows magnetizing and starting of the induction motor in a stable manner. If both poles were to be placed at $s = 0$, the system would be unstable in the starting condition, which is a typical problem in conventional V/Hz control as well as in sensorless control if the observer gain is not well designed. At high speeds, the choice in (18) results in poles located at $s=-(\zeta_\infty \pm j\sqrt{1-\zeta_\infty^2})|\omega_s|$. Studying the pole locations and the resulting observer equations reveals that the choice in (18) makes the observer dynamics to vary from the current-model-type dynamics (for the magnitude of the estimate) to well-damped voltage-model-type dynamics as the frequency increases starting from zero.

Moving on to the implementation of the state feedback control element 203, the state feedback control element 203 may be configured to calculate the stator voltage reference vector $u_{s,ref}$ based on the detected stator current vector $i_s$, the stator angular frequency $\omega_s$, the stator flux linkage reference vector $\psi_{s,ref}$ and the stator flux linkage vector $\hat{\psi}_s$ estimated by the (reduced-order) flux observer 204. Specifically, the state feedback control element 203 may be configured to calculate the stator voltage reference vector $u_{s,ref}$ as $$u_{s,ref}=R_s i_s+\omega_s J\psi_{s,ref}+K(\psi_{s,ref}-\hat{\psi}_s), \quad (19)$$

where K is a pre-defined 2×2 state-feedback gain matrix. The control law of (19) is a special case of state-feedback control. Since no angular rotor speed (or its estimate) appears in the control law of (19), it is inherently speed-sensorless.

When the reduced-order flux observer is employed, the control law (19) may be rewritten in an alternative form which provides some practical merits. Namely, when the reduced-order flux observer is used, the equation $\hat{\psi}_s=\hat{\psi}_R+L_\sigma i_s$ holds. Therefore, the equation (19) may be written as $$u_{s,ref}=R_s i_s+\omega_s J\psi_{s,ref}+L_\sigma K(i_{s,ref}-i_s), \quad (20)$$

where $i_{s,ref}$ is an intermediate stator current reference vector defined as $$i_{s,ref}=\frac{\psi_{s,ref}-\hat{\psi}_R}{L_\sigma}. \quad (21)$$

The intermediate stator current reference vector $i_{s,ref}$ may be saturated in order to limit the stator current.

In some embodiments, the state-feedback gain matrix K in the control law (19) or (20) may be selected to have the form $$K=\sigma_0 I-\omega_s J. \quad (22)$$

Here, the x- and y-axis dynamics are decoupled. However, this decoupling may be considered unnecessary. Consequently, the state-feedback gain matrix K in the control law (19) or (20) may be selected to have an even simpler form $$K=\sigma_0 I. \quad (23)$$

Here, the exponential decay parameter $\sigma_0$ may be correspond, at least approximately, to a closed-loop bandwidth of the observer-based V/Hz control scheme. Since the natural frequency is not altered with the selection of (23), the robustness against parameter errors is slightly better than in the case of the xy-decoupled design of (22).

As was indicated above and as shown in FIG. 2, the value of the estimated torque $\hat{\tau}_m$ may, at least in some embodiments, be calculated by the state observer 204 (e.g., using (10a) or (10b)) and applied to elements 205, 206 in order to apply damping. Specifically, the internal stator frequency reference $\omega_s$ may be selected or formed, using elements 205, 206, as $$\omega_s=\omega_{s,ref}-k_\omega(\hat{\tau}_m-\hat{\tau}_{mf}), \quad (24)$$

where $\omega_{s,ref}$ is an external (rate-limited) stator frequency reference, $k_\omega$ is a positive gain for increasing the damping and $\hat{\tau}_{mf}$ is a low-pass filtered estimated torque (and thus, the term $\hat{\tau}_m-\hat{\tau}_{mf}$ corresponds to a high-pass filtered estimated torque). The low-pass filtered estimated torque $\hat{\tau}_{mf}$ may be defined according to $$\frac{d\hat{\tau}_{mf}}{dt}=\alpha_f(\hat{\tau}_m-\hat{\tau}_{mf}) \quad (25)$$

where $\alpha_f$ is a bandwidth of a first low-pass filter (i.e., a low-pass filter for filtering the estimated torque). Equivalently, the internal stator frequency reference $\omega_s$ may be expressed (in Laplace domain) as $$\omega_s=\omega_{s,ref}-F(s)\hat{\tau}_m, \quad (26)$$

where the high-pass filter response F(s) may ne defined as $$F(s)=\frac{k_\omega s}{s+\alpha_f}$$

and s is the complex frequency variable of Laplace domain (being equal to d/dt).

In some embodiments, a slip compensation scheme may be integrated into the observer-based V/Hz control method described above. In such embodiments, the stator frequency reference $\omega_{s,ref}$ may correspond to a sum of an external speed reference $\omega_{m,ref}$ and a low-pass-filtered estimated slip frequency, that is, the stator frequency reference $\omega_{s,ref}$ may be defined as $$\omega_{s,ref}=\omega_{m,ref}+\frac{\alpha_r}{s+\alpha_r}\hat{\omega}_r, \quad (27)$$

where $\alpha_r$ is a bandwidth of a second low-pass filter (i.e., a low-pass filter for filtering the estimated slip frequency). As was mentioned above, the estimated (instantaneous) angular slip frequency $\hat{\omega}_r$ may be obtained from (16).

If slip compensation is employed as described above, the complete stability of the observer-based V/Hz control method may not be fully guaranteed as the filter resulting from the combination of (26) & (27) is, in general, not passive, unlike the high-pass filter of (26) itself. However, if the bandwidth $\alpha_r$ is low (i.e., it is selected to be below a pre-defined bandwidth threshold), the slip compensation may not (significantly) affect stability of the observer-based V/Hz control.

In contrast to FIG. 2, in some alternative embodiments, the state observer element 204 may be configured to output at least a rotor flux linkage vector $\hat{\psi}_R$ (as opposed to a stator flux linkage vector $\hat{\psi}_s$) to the state feedback control element 203. Correspondingly, the state feedback control element 203 may be configured to calculate the stator voltage reference vector $u_{s,ref}$ based on the rotor flux linkage vector WR (as opposed to a stator flux linkage vector $\hat{\omega}_s$). As noted also above, when the reduced-order flux observer is used, the equation $\hat{\psi}_s=\hat{\psi}_R+L_\sigma i_s$ holds. Therefore, knowing the (detected) stator current vector $i_s$ and one of the stator flux linkage vector $\hat{\psi}_s$ and the rotor flux linkage vector $\hat{\psi}_R$ enables calculation of the other one of the stator flux linkage vector $\hat{\psi}_s$ and the rotor flux linkage vector $\hat{\psi}_R$. Therefore, the discussion provided above may apply, mutatis mutandis, in these cases.

FIG. 3 illustrates a process according to embodiments for performing observer-based V/Hz control of an induction motor. The process may be carried out by a drive or specifically by a computing device comprised in the drive. For example, the process may be carried out by the drive 101 of FIG. 1 or specifically by the computing device 104 of FIG. 1 comprised in the drive 101. Specifically, at least one processor of the computing device of the drive and at least one memory of the computing device of the drive for storing instructions to be executed by the at least one processor may be configured so as to cause the drive to carry out the illustrated process. In the following discussion, the actor of the process is called "the apparatus" for simplicity.

FIG. 3 provides a generic embodiment. Any of the specific features discussed above in connection with FIGS. 1 and 2 may be combined with the process of FIG. 3.

Referring to FIG. 3, the apparatus obtains, in block 301, a stator current vector of the induction motor (or specifically a measurement of the stator current vector of the induction motor). The obtaining of the stator current vector in block 301 may comprise receiving a stator current vector in stator coordinates as measured by a current detector of the drive from an output of an inverter of the drive and converting the measured stator current vector from stator coordinates to control coordinates (which may be defined to rotate at a rate defined by the stator angular frequency reference).

The apparatus estimates, in block 302, using a state observer for the stator and/or rotor flux linkage vector of the induction motor (i.e., a flux observer), the stator and/or rotor flux linkage vector based on the stator current vector, a (pre-defined) voltage reference vector and a (pre-defined) stator angular frequency reference. Here, the state observer is a speed-sensorless reduced-order state observer based on a mathematical model of the induction motor. The state observer may be defined in control coordinates. The mathematical model of the induction motor may be, for example, an inverse-$\Gamma$ model, a T model or a $\Gamma$ model of the induction motor. The state observer may employ an observer gain matrix $K_O$ with a form selected for enabling speed-sensorless estimation of the stator and/or rotor flux linkage using the state observer. In other words, the observer gain matrix $K_O$ may be selected to have a form which makes indirect estimation of the angular speed of the induction motor possible (as opposed using a speed sensor for directly measuring the angular speed of the induction motor). The observer gain matrix $K_O$ may have the form defined in (13), (14) or (17). The state observer may operate using control coordinates.

In some embodiments, the apparatus may estimate, in block 302, also the torque of the induction motor based on the stator current vector, the voltage reference vector and the stator angular frequency reference.

The apparatus performs, in block 303, speed-sensorless state-feedback control based on the estimated stator or rotor flux linkage vector, the stator current vector, a (pre-defined) stator flux linkage reference vector and the stator angular frequency reference so as to calculate the stator voltage reference vector. The speed-sensorless state-feedback control may be performed using control coordinates. In some embodiments, the apparatus may apply, in block 303, the control law of (19) or (20) for deriving the stator voltage reference vector.

The apparatus applies, in block 304, the stator voltage reference vector to an inverter of the drive feeding the induction motor. The applying of the stator voltage reference vector to the inverter in block 304 may comprise converting the stator voltage reference vector from control coordinates to stator coordinates and applying the stator voltage reference vector in the stator coordinates to the inverter.

In some embodiments, the apparatus may be configured to adjust the value of the stator angular frequency reference based on high-pass-filtered estimated torque for improving damping. Namely, the apparatus may estimate, using the state observer, a torque of the induction motor based on the stator current vector, the stator voltage reference vector and the stator angular frequency, high-pass filter the estimated torque and calculate the stator angular frequency reference by adjusting a value of an external stator angular frequency reference based on the high-pass-filtered estimated torque.

Figure 4:
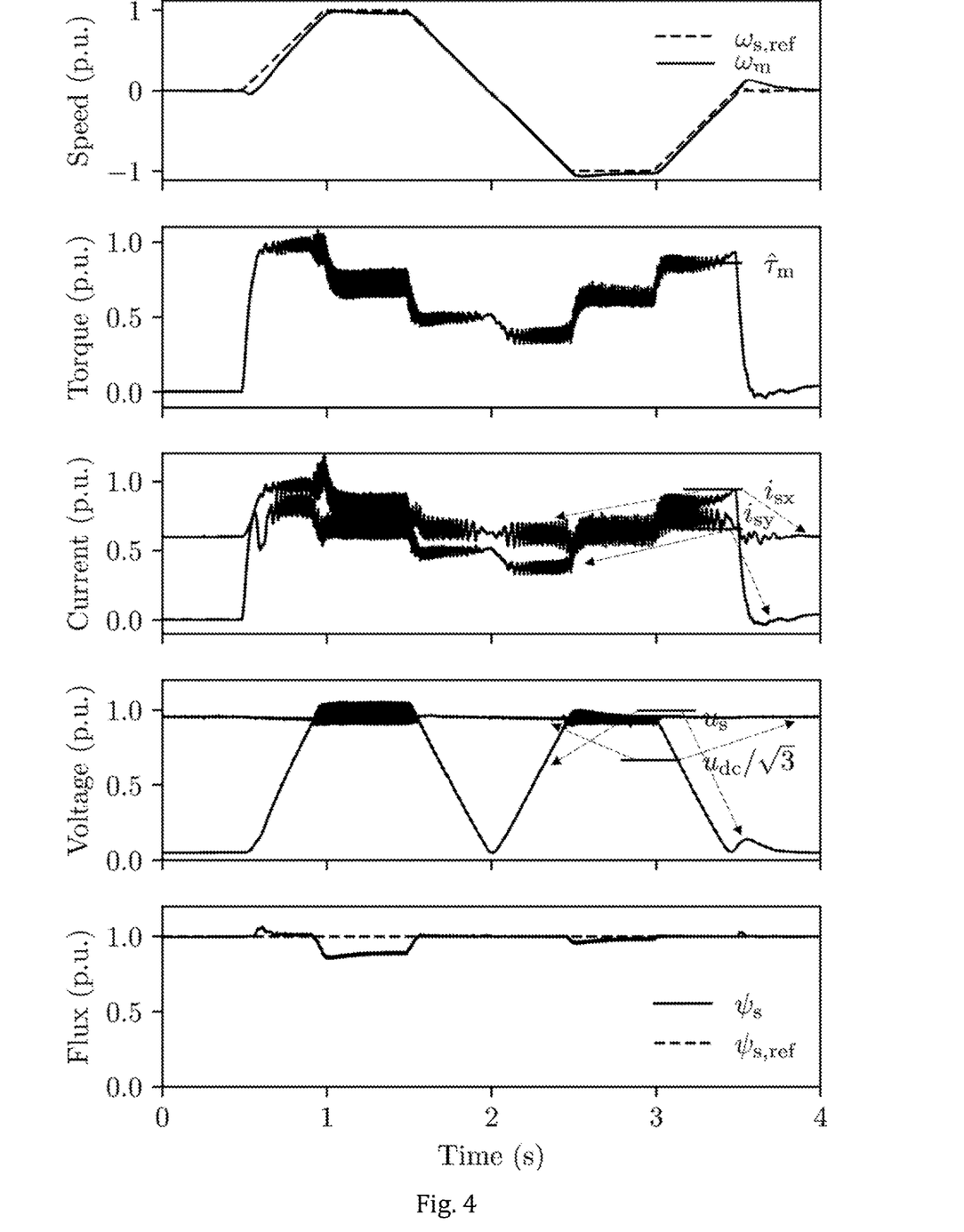
FIG. 4 illustrates experimental results for the observer-based V/Hz control according to embodiments.

FIG. 4 illustrates experimental results of the observer-based V/Hz control method according to embodiments. Specifically, FIG. 4 shows experimental results for the stator angular frequency reference $\omega_{s,ref}$ and the angular speed $\omega_m$ in the top subfigure, the estimated torque $\hat{\tau}_m$ in the second-from-the-top subfigure, x- and y-axis stator currents $i_{sx}$ & $i_{sy}$ in the third-from-the-top subfigure, the stator voltage us and DC-link voltage $u_{DC}/\sqrt{3}$ in the fourth-from-the-top subfigure and the stator flux linkage $\psi_s$ and the stator flux linkage reference $\psi_{s,ref}$ in the bottom subfigure (all values being given in p.u.).

A 2.2-kW four-pole induction motor is used here as an example motor. The following rated values are defined for the 2.2-kW four-pole induction motor:

Voltage (line-to-neutral, peak value): $\sqrt{2/3}\cdot 400$ V, 1 p.u.
Current (peak value): $\sqrt{2}\cdot 5$ A, 1 p.u.
Frequency: 50 Hz, 1 p.u.
Speed: 1430 r/min, 0.95 p.u.
Torque: 14.6 Nm, 0.66 p.u.

Moreover, the following parameters are defined for the 2.2-kW four-pole induction motor:

Stator resistance $R_s$: 3.7 $\Omega$, 0.080 p.u.
Rotor resistance $R_R$: 2.1 $\Omega$, 0.045 p.u.
Leakage inductance $L_\sigma$: 21 mH, 0.143 p.u.
Magnetizing inductance $L_M$: 224 mH, 1.524 p.u
Total inertia $J_M$: 0.0155 kgm$^2$, 67.1 p.u.

The experiments were conducted on the proposed control method using a dSPACE MicroLabBox prototyping unit. The switching frequency was 4 kHz, and the inverter non-linearities were compensated for using a current feedforward method. The rotor speed was measured using a resolver for monitoring purposes.

An inverse-$\Gamma$ model is used for the induction motor. The variant (20) of the proposed control law is used. The state-feedback gain is selected according to (23) with $\sigma_c=2\pi\cdot 20$ rad/s. The bandwidth of the high-pass filter F(s) is $\alpha_f=2\pi\cdot 1$ rad/s and the damping gain is $k_\omega=3$ (Nm·s)$^{-1}$. The design parameters for the observer are $\zeta==0.7$ and $\alpha_o=2\pi\cdot 40$ rad/s. It is to be noted that the choice of these design parameters is not critical, i.e., they could be varied in a wide range. The slip compensation is disabled.

The control sequence illustrated in FIG. 4 is as follows. First, the frequency reference is ramped from zero to the rated frequency, then reversed, and finally ramped back to zero. The load torque increases stepwise from zero to its rated value (0.66 p.u.) in the beginning of the acceleration. When the frequency reference finally reaches zero at the end of the sequence, the load torque decreases stepwise to zero. It is to be noted that the chosen sequence is particularly difficult for speed sensorless control methods due to the stepwise change of load torque at zero speed and slow speed reversal while loaded.

FIG. 4 clearly shows that the system is stable and well damped. The magnetization is fast and well damped, corresponding to the desired stator-flux dynamics.

The embodiments of the proposed observer-based V/Hz control provide at least some of the following technical advantages (depending on the particular embodiment):

No speed detector or controller needs to be implemented in the drive which simplifies the architecture of the drive as well as simplifying the tuning of the control system.

Field weakening is inherent to the observer-based V/Hz control without needing a separate algorithm.

Full utilization of the inverter voltage is enabled since no voltage margin is needed.

The observer-based V/Hz control method is completely stable and passive, and, consequently, robust against unknown mechanics.

As compared to heuristic V/Hz control structures, a trial-and-error process in tuning can be reduced since all the design parameters have a clear physical meaning.

If the slip compensation is enabled, the substantially complete stability of the observer-based V/Hz control method may be preserved as long as the bandwidth of the second filter $\alpha_r$ is low enough.

The blocks, related functions, and information exchanges described above by means of FIGS. 2 and 3 are in no absolute chronological order, and some of them may be performed simultaneously or in an order differing from the given one. Other functions can also be executed between them or within them. Some of the blocks or part of the blocks or one or more pieces of information can also be left out or replaced by a corresponding block or part of the block or one or more pieces of information.

In an embodiment, at least some of the processes described in connection with FIGS. 2 and 3 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form (processing) means or comprises one or more computer program code portions for carrying out one or more operations according to any one of the embodiments of FIGS. 2 and 3 or operations thereof.

Embodiments as described may also be carried out in the form of a computer process defined by a computer program or portions thereof. Embodiments of the methods described in connection with FIGS. 2 and 3 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

While many of the features of the embodiments were discussed above using specific matrix and vector-based equations (1)-(27), it should be noted that many of said equations may be written in multiple equivalent forms. The embodiments are not limited to the particular forms used in (1)-(27) but also encompass any mathematically equivalent forms of the same equations.

Even though the embodiments have been described above with reference to examples according to the accompanying drawings, it is clear that the embodiments are not restricted thereto but can be modified in several ways within the scope of the appended claims. Therefore, all words and expressions should be interpreted broadly, and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus for a drive for driving an induction motor, the apparatus comprising:
   a stator current vector of the induction motor;
   a state observer for a stator and/or rotor flux linkage vector of the induction motor, the state observer estimating the stator and/or rotor flux linkage vector based on the stator current vector, a voltage reference vector and a stator angular frequency reference, wherein the state observer is a speed-sensorless reduced-order state observer based on a mathematical model of the induction motor;
   speed-sensorless state-feedback control based on the estimated stator and/or rotor flux linkage vector, the stator current vector, a stator flux linkage reference vector and the stator angular frequency reference so as to calculate a stator voltage reference vector; and
   an application of the stator voltage reference vector to an inverter of the drive feeding the induction motor.

2. The apparatus of claim 1, wherein the state observer and the speed-sensorless state-feedback control operate using control coordinates, wherein the stator current vector is obtained by receiving a stator current vector defined in stator coordinates and measured by a current detector from an output of the inverter and converting the measured stator current vector from the stator coordinates to the control coordinates defined to rotate at a rate defined by the stator angular frequency reference, and the application of the stator voltage reference vector includes converting the stator voltage reference vector from the control coordinates to the stator coordinates and applying the stator voltage reference vector in stator coordinates to the inverter.

3. The apparatus of claim 1, wherein state variables of the state observer comprise the stator current vector and the stator or rotor flux linkage vector and the state observer employs an observer gain matrix $K_O$ and an associated correction vector e defined for the stator or rotor flux linkage vector, the observer gain matrix $K_O$ having a form selected for enabling decoupling of stator and/or rotor flux linkage estimation error dynamics from rotor angular speed estimation error dynamics.

4. The apparatus of claim 3, wherein the state observer is configured to follow a state equation $$\frac{d\hat{\psi}_R}{dt} = u_{s,ref} - (R_s I + \omega_s L_\sigma J)i_s - L_\sigma \frac{di_s}{dt} - \omega_s J\hat{\psi}_R + K_0 e$$

wherein $\hat{\psi}_R$ is the rotor flux linkage vector, $u_{s,ref}$ is the stator voltage reference vector, $L_\sigma$ is a leakage induction of the induction motor, $i_s$ is the stator current vector, $R_s$ is a stator resistance of the induction motor, I is an identity matrix, $\omega_s$ is the stator angular frequency reference, J is an orthogonal rotation matrix, t is time and e is the correction vector having the form $$e = L_\sigma \frac{di_s}{dt} + (R_\sigma I + \omega_s L_\sigma J)i_s - (\alpha I - \hat{\omega}_m J)\hat{\psi}_R - u_{s,ref}$$

wherein $R_\sigma = R_s + R_R$ is a total resistance of the induction motor, $\alpha$ is an inverse rotor time constant of the induction motor and $\hat{\omega}_m$ is an estimated angular speed of the induction motor, $R_R$ being a rotor resistance of the induction motor.

5. The apparatus of claim 4, wherein the stator flux linkage vector of the induction motor $\hat{\psi}_s$ is calculated using the state observer according to $$\hat{\psi}_s = \hat{\psi}_R + L_\sigma i_s$$

wherein $\hat{\psi}_R$ is derivable based on the reduced-order state observer equation.

6. The apparatus of claim 3, wherein the observer gain matrix $K_0$ is defined as $$K_0 = \frac{G\hat{\psi}_R \hat{\psi}_R^T}{\|\hat{\psi}_R\|^2}$$

wherein $G = g_1 I + g_2 J$ is a pre-defined gain matrix, and $\hat{\psi}_R$ is the rotor flux linkage vector, $g_1$ and $g_2$ being gain terms of the pre-defined gain matrix, I being an identity matrix and J being an orthogonal rotation matrix.

7. The apparatus of claim 3, wherein the observer gain matrix $K_0$ is defined as $$K_0 = \frac{2\sigma_0(\alpha I + \hat{\omega}_m J)}{\alpha^2 + \hat{\omega}_m^2} \frac{\hat{\psi}_R \hat{\psi}_R^T}{\|\hat{\psi}_R\|^2}$$

wherein $\sigma_0$ is a desired exponential decay rate of an estimation error, $\alpha$ is an inverse rotor time constant, I is an identity matrix, $\hat{\omega}_m$ is an estimated angular speed of the induction motor, J is an orthogonal rotation matrix, $\hat{\psi}_R$ is the rotor flux linkage vector.

8. The apparatus of claim 7, wherein means are configured to calculate the estimated angular speed of the induction motor $\hat{\omega}_m$ based on $$\frac{d\hat{\omega}_m}{dt} = \alpha_0 \frac{\hat{\psi}_R^T J e}{\|\hat{\psi}_R\|^2}$$

wherein $\alpha_0$ is speed-estimation bandwidth and e is the correction vector of the state observer.

9. The apparatus of claim 7, wherein the estimated angular speed of the induction motor $\hat{\omega}_m$ is estimated to be equal to the stator angular frequency reference $\omega_s$.

10. The apparatus of claim 3, wherein means are further configured to perform:
estimating, using the state observer, a torque of the induction motor $\hat{\tau}_m$ according to $$\hat{\tau}_m = i_s^T J \hat{\psi}_R \text{ or}$$

$$\hat{\tau}_m = i_s^T J \hat{\psi}_s$$

wherein $i_s$ is the stator current vector, J is an orthogonal rotation matrix, and $\hat{\psi}_R$ is the rotor flux linkage vector derivable using the state observer;
high-pass filtering the estimated torque; and
calculating the stator angular frequency reference by adjusting a value of an external stator angular frequency reference based on the high-pass-filtered estimated torque.

11. The apparatus of claim 1, wherein means are further configured to perform:
estimating, using the state observer, a torque of the induction motor based on the stator current vector and the stator or rotor flux linkage vector derivable using the state observer;
high-pass filtering the estimated torque; and
calculating the stator angular frequency reference by adjusting a value of an external stator angular frequency reference based on the high-pass-filtered estimated torque.

12. The apparatus of claim 11, wherein means are configured to calculate the stator angular frequency reference $\omega_s$ according to $$\omega_s = \omega_{s,ref} - F(s)\hat{\tau}_m$$

wherein $\omega_{s,ref}$ is the external stator angular frequency reference, $$F(s) = \frac{k_\omega s}{s + \alpha_f}$$

is a highpass filter response in Laplace domain and $\hat{\tau}_m$ is the estimated torque, $k_\omega$ being a positive gain term form increasing damping and $\alpha_f$ being a bandwidth of the high-pass filter.

13. The apparatus of claim 1, wherein means are configured to perform the speed-sensorless state-feedback control for calculating the stator voltage reference vector $u_{s,ref}$ according to $$u_{s,ref} = R_s i_s + \omega_s J \psi_{s,ref} + K(\psi_{s,ref} - \hat{\psi}_s)$$

wherein $R_s$ is a stator resistance of the induction motor, $i_s$ is the stator current vector, $\omega_s$ is the stator reference, J is an orthogonal rotation matrix, $\psi_{s,ref}$ is the stator flux linkage reference vector, $\hat{\psi}_s$ is the stator flux linkage vector estimated by the state observer and K is a pre-defined 2×2 state-feedback gain matrix.

14. The apparatus of claim 1, wherein the mathematical model of the induction motor is an inverse-Γ model, a T model or a Γ model.

15. An electric drive configured to drive an induction motor, the electric drive comprising an inverter and a computing device having a processor, and a memory storing instructions that, when executed by the processor, cause the computing device to:
obtain a stator current vector of the induction motor;
estimate, using a state observer for a stator and/or rotor flux linkage vector of the induction motor, the stator and/or rotor flux linkage vector based on the stator current vector, a voltage reference vector and a stator angular frequency reference, wherein the state observer is a speed-sensorless reduced-order state observer based on a mathematical model of the induction motor;

perform speed-sensorless state-feedback control based on the estimated stator and/or rotor flux linkage vector, the stator current vector, a stator flux linkage reference vector and the stator angular frequency reference so as to calculate a stator voltage reference vector; and apply the stator voltage reference vector to the inverter for feeding the induction motor.

16. A method comprising:

obtaining a stator current vector of an induction motor;

estimating, using a state observer for a stator and/or rotor flux linkage vector of the induction motor, the stator and/or rotor flux linkage vector based on the stator current vector, a voltage reference vector and a stator angular frequency reference, wherein the state observer is a speed-sensorless reduced-order state observer based on a mathematical model of the induction motor;

performing speed-sensorless state-feedback control based on the estimated stator and/or rotor flux linkage vector, the stator current vector, a stator flux linkage reference vector and the stator angular frequency reference so as to calculate a stator voltage reference vector; and applying the stator voltage reference vector to an inverter of an electric drive feeding the induction motor.

17. A computer program product comprising program instructions embodied on a non-transitory computer readable medium for performing at least the following:

obtaining a stator current vector of an induction motor;

estimating, using a state observer for a stator and/or rotor flux linkage vector of the induction motor, the stator and/or rotor flux linkage vector based on the stator current vector, a voltage reference vector and a stator angular frequency reference, wherein the state observer is a speed-sensorless reduced-order state observer based on a mathematical model of the induction motor;

performing speed-sensorless state-feedback control based on the estimated stator and/or rotor flux linkage vector, the stator current vector, a stator flux linkage reference vector and the stator angular frequency reference so as to calculate a stator voltage reference vector; and applying the stator voltage reference vector to an inverter of a drive feeding the induction motor.

* * * * *